US008788186B2

(12) United States Patent
de los Reyes et al.

(10) Patent No.: US 8,788,186 B2
(45) Date of Patent: Jul. 22, 2014

(54) CELLULAR-BASED LIVE TRAFFIC SERVICE

(71) Applicant: AT&T Intellectual Property I, L.P., Atlanta, GA (US)

(72) Inventors: Gustavo de los Reyes, Fair Haven, NJ (US); Gang Xu, Piscataway, NJ (US)

(73) Assignee: AT&T Intellectual Property I, L.P., Atlanta, GA (US)

(*) Notice: Subject to any disclaimer, the term of this patent is extended or adjusted under 35 U.S.C. 154(b) by 0 days.

(21) Appl. No.: 14/166,199

(22) Filed: Jan. 28, 2014

(65) Prior Publication Data

US 2014/0142843 A1 May 22, 2014

Related U.S. Application Data

(63) Continuation of application No. 13/781,928, filed on Mar. 1, 2013, which is a continuation of application No. 13/644,302, filed on Oct. 4, 2012, now Pat. No. 8,406,987, which is a continuation of application No. 12/632,969, filed on Dec. 8, 2009, now Pat. No. 8,296,046.

(51) Int. Cl.
*G01C 21/34* (2006.01)
*G08G 1/01* (2006.01)

(52) U.S. Cl.
CPC ............ *G08G 1/012* (2013.01); *G01C 21/3492* (2013.01)
USPC .......................... 701/118; 701/410; 455/456.5

(58) Field of Classification Search
USPC ........................................................ 701/208
See application file for complete search history.

(56) References Cited

U.S. PATENT DOCUMENTS

| | | | | |
|---|---|---|---|---|
| 5,933,100 A * | 8/1999 | Golding | .................. | 340/995.13 |
| 5,960,341 A * | 9/1999 | LeBlanc et al. | ............ | 455/426.1 |
| 8,140,265 B2 * | 3/2012 | Grush | ............ | 701/468 |
| 8,208,382 B2 * | 6/2012 | Jerbi et al. | .................... | 370/241 |
| 2004/0220728 A1 * | 11/2004 | Cayford | ........................ | 701/209 |
| 2006/0276962 A1 * | 12/2006 | Yoshioka et al. | ............. | 701/208 |
| 2007/0225912 A1 * | 9/2007 | Grush | ............ | 701/213 |
| 2008/0046165 A1 * | 2/2008 | Downs et al. | ................. | 701/117 |
| 2009/0075651 A1 * | 3/2009 | MacNaughtan et al. | ...... | 455/434 |
| 2009/0157566 A1 * | 6/2009 | Grush | ............ | 705/400 |
| 2009/0171577 A1 * | 7/2009 | Roumeliotis et al. | ......... | 701/209 |
| 2009/0174600 A1 * | 7/2009 | Mazlum et al. | .......... | 342/357.12 |
| 2009/0177382 A1 * | 7/2009 | Alles et al. | .................... | 701/208 |
| 2010/0004856 A1 * | 1/2010 | Kobori et al. | ................. | 701/208 |
| 2010/0057357 A1 * | 3/2010 | Miyata et al. | ................. | 701/209 |
| 2010/0094532 A1 * | 4/2010 | Vorona | ......................... | 701/119 |
| 2010/0114484 A1 * | 5/2010 | Kida et al. | .................... | 701/208 |
| 2010/0248640 A1 * | 9/2010 | MacNaughtan et al. | ... | 455/67.11 |
| 2010/0256836 A1 * | 10/2010 | Mudalige | ......................... | 701/2 |

* cited by examiner

*Primary Examiner* — Shelley Chen
(74) *Attorney, Agent, or Firm* — Baker & Hostetler LLP

(57) ABSTRACT

A cellular-based live traffic service that does not require pre-deployment of infrastructure or GPS-enabled devices uses signals provided by cellular devices to determine course resolution localization and tracking information of the cellular devices. Specialized statistical analysis is performed on the course resolution data to infer the fine resolution positions of the cellular devices. In an example embodiment, the localization and tracking information is provided on a map, or the like, to show relative position and/or trajectory of cellular devices.

18 Claims, 8 Drawing Sheets

CELLULAR-BASED LIVE TRAFFIC SERVICE

CROSS-REFERENCE TO RELATED APPLICATIONS

The instant application is a continuation of, and claims priority to, U.S. patent application Ser. No. 13/781,928, filed Mar. 1, 2013. U.S. patent application Ser. No. 13/781,928 is a continuation of U.S. patent application Ser. No. 13/644,302, filed Oct. 4, 2012, which issued on Mar. 26, 2012 with U.S. Pat. No. 8,406,987. U.S. patent application Ser. No. 13/644,302 is a continuation of, and claims priority to, Ser. No. 12/632,969, filed Dec. 8, 2009, which issued on Oct. 23, 2012, with U.S. Pat. No. 8,296,046. U.S. patent application Ser. No. 13/781,928 is incorporated by reference herein in its entirety. U.S. patent application Ser. No. 13/644,302 is incorporated by reference herein in its entirety. U.S. patent application Ser. No. 12/632,969 is incorporated by reference herein in its entirety. U.S. Pat. No. 8,406,987 is incorporated by reference herein in its entirety. U.S. Pat. No. 8,296,046 is incorporated by reference herein in its entirety.

BACKGROUND

Information pertaining to current traffic (live traffic information) can be of great value to drivers because it can aid drivers in determining how best to avoid traffic situations (e.g., traffic jam, accident, etc.) and select routes (e.g., fastest, most fuel efficient, etc.) to destinations. Existing techniques for obtaining traffic information are expensive and require specialized equipment and infrastructures. For example, a technique for obtaining traffic information involves receiving real-time traffic data from a transportation department or departments. This requires the transportation department to build and maintain an infrastructure comprising networked traffic cameras and/or sensors place at various locations along roadways and intersections. Another technique utilizes specially equipped (e.g., cameras, sensors, transmitters, receivers) vehicles assigned to drive specific routes and/or roads. Equipping and maintaining a fleet of such vehicles can be expensive and time consuming. Also, it is impracticable to expect to have enough vehicles to provide live traffic information for all roads in a geographic region.

SUMMARY

Live traffic information is obtained by determining course resolution localization of traffic utilizing existing cellular system infrastructures and by performing specialized statistical analysis on the course resolution localization information to obtain finer resolution live traffic information. In an example embodiment, a cellular-based live traffic view service uses the cellular signal of regular cellular devices (e.g., phones, PDAs, laptops, etc.) to provide coarse-grained positioning and tracking of the cellular devices on a map. The service then performs statistical analysis to infer fine-grained positions of the devices on the map. Note that this live traffic information service/system does not require GPS-enabled devices or the network infrastructure needed accommodate GPS-enabled devices. No extra hardware or software is required to be added to the cellular devices.

DETAILED DESCRIPTION OF ILLUSTRATIVE EMBODIMENTS

A cellular-based live traffic service that does not require pre-deployment of infrastructure or GPS-enabled devices uses signals provided by cellular devices (e.g., devices capable of communications via a cellular network) to determine course resolution, also referred to herein as course-grained, positioning (localization) and tracking information of the cellular devices. Specialized statistical analysis is performed on the course resolution data to infer the fine resolution, fine-grained, positions of the cellular devices. In an example embodiment, the localization and tracking information is provided on a map, or the like, to show relative position and/or trajectory of cellular devices.

As a cellular device communications with a cellular network (e.g., base station, cellular tower, etc.), the position of the cellular device is determined within limits of the accuracy of the cellular network. Each base station, or the like, covers a certain fixed region, also referred to as a cell. For example, for some GSM macro-cells, ranges of 35 km with an accuracy of 75 meters are achievable.

Figure 1:
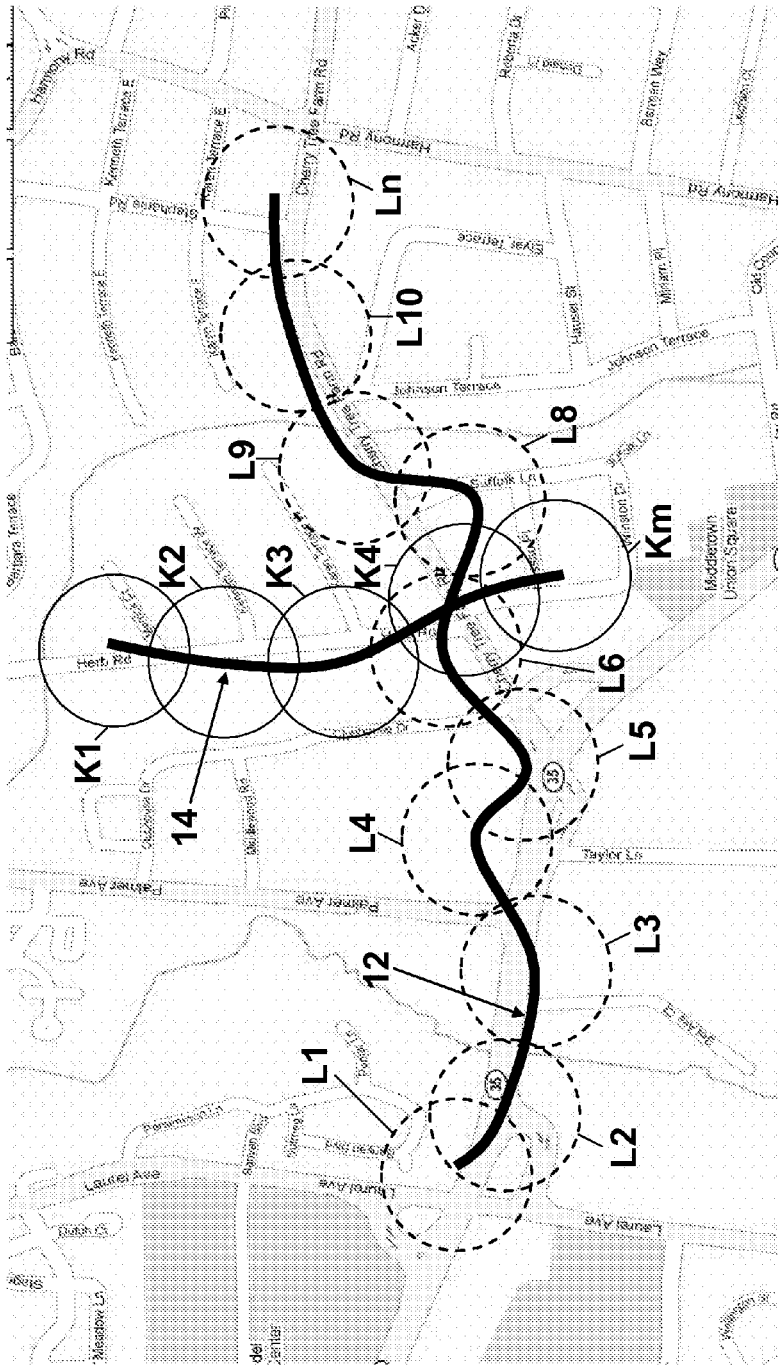
FIG. 1 depicts example course resolution and fine resolution localization traffic information overlaid on a map.

FIG. 1 depicts example course resolution and fine resolution localization traffic information overlaid on a map. As described herein, location samples of a cellular device are obtained over time. Each location is represented as a 3-tuple by the following Equation (1).

$$L = (<x,y>, r, t) \qquad (1)$$

Thus, the localization region, L, can be represented as a function of a geographic region ($<x,y>$), an estimated error (r), and time (t). That is, $<x, y>$ represents the coordinates of the estimated position of the cellular device at time t. And, r is the estimated error (radius) of measurement. The location sample L indicates that, at time t, the cellular device was estimated to be in the region L, having radius equal to r. It is to be understood that although L is depicted as a circle, L is not limited thereto. L can be any appropriate shaped region, the center of the region, X, can be determined as the centroid of the region.

Signals from a cellular device are sampled over time, and a series of samples (localization regions) is determined for each cellular device. As shown in FIG. 1, a series of localization regions for a cellular device are depicted as L1, L2, L3, L4, L5, L6, L7, L8, L9, L10, and Ln. A series of localization regions for another cellular device are depicted as K1, K2, K3, K4, and Km. As described herein, the trajectory of each cellular device is deduced/estimated. The localization regions and trajectories can be correlated with a map and can be shown as overlaid on a map.

Figure 2:
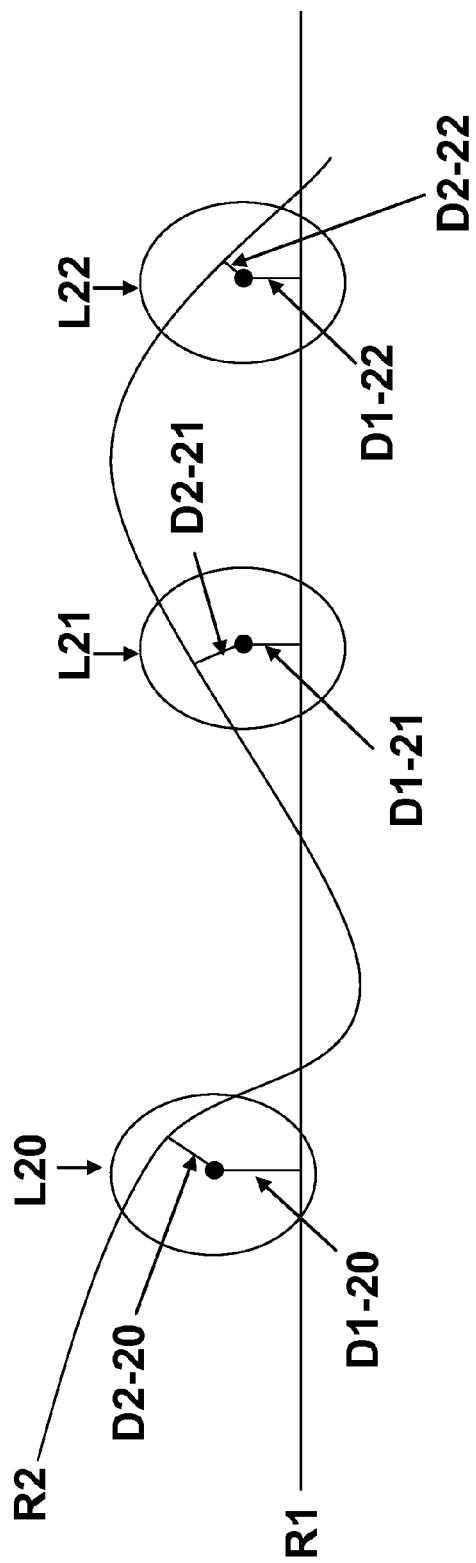
FIG. 2 depicts two routes, R1 and R2 that intersect with localization regions L20, L21, and L22.

To deduce a trajectory of a cellular device, all the routes (e.g., roads) on a map that intersect with each of the localization regions (e.g., L1 though Ln and K1 through Km) are determined FIG. 2 depicts two routes, R1 and R2 that intersect with localization regions L20, L21, and L22. Denoting routes intersecting with localization regions generally as R1, R2, . . . Rm, for each route Ri in R1, R2, Rm, the shortest distance from Ri to the center of the localization region is determined. The shortest distance is calculated as the shortest Euclidean distance between the center (centroid) of the localization region to Ri. For example, this can be calculated as the distance between the centroid ($<xc, yc>$) and the point ($<xt, yt>$) on Ri where a circle centered at the centroid is tangent with Ri: $Di^2=(xc-xt)^2+(yc-yt)^2$. As shown in FIG. 2, the shortest distance from the centroid of localization region L20 to the route R1 is D1-20, the shortest distance from the centroid of localization region L20 to the route R2 is D2-20, the shortest distance from the centroid of localization region L21 to the route R1 is D1-21, the shortest distance from the centroid of localization region L21 to the route R2 is D2-21, the shortest distance from the centroid of localization region L22 to the route R1 is D1-22, and the shortest distance from the centroid of localization region L22 to the route R2 is D2-22. Denoting a shortest distance between a route and each localization region as Dj, the aggregate (e.g., summation) of the square of the Dj's, denoted as Sj, is calculated in accordance with Equation (2). Sj represents the summation of the square of the Dj's.

$$S_j = \frac{1}{n}\sum_{j=0}^{n}(D_j)^2 \qquad (2)$$

where n represents the number of localization regions, j represents an increment variable for the summation, and Dj represents respective values of the shortest distances.

The two smallest aggregated values, denoted as and $S_{j1}$ and $S_{j2}$, are used to formulate an accuracy statistic, denoted as F, to indicate an accuracy of the deduced/estimated location and tracking information. The accuracy statistic is computed by determining the ratio of the two smallest aggregated values in accordance with Equation (3).

$$F = \frac{S_{j3}}{S_{j3}}, \text{ where } Sj1 > Sj2. \qquad (3)$$

The statistic F has the properties of the underlying distribution of the localization error. For example, if the error of the localization mechanism (e.g., GSM macro cell) is Gaussian, then F is an F-statistic having Gaussian properties. Accordingly, the cellular device's route can be determined within a calculable confident level. For example, for n=10, if F>2.98, we can conclude that the phone's route is j1 with 95% confidence. The confidence level can be determined, for example, by the application and/or the service provider. The higher the confidence level, the lower the false positive rate (e.g., the lower the chance of choosing a wrong route).

Referring again to FIG. 1, by analyzing the time series of the location samples, the trajectory of each cellular device can be determined and correlated to a map. As shown in FIG. 1 the trajectory, represented by line 12, of a first cellular device can be mapped (correlated to) Cherry Tree Farm Road. And, the trajectory, represented by line 14, of a second cellular device can be mapped (correlated to) Herb Road.

When the route of a cellular device is determined, localization information is determined, during the same time period, from other cellular devices moving along the same route (within error limitations), each of which provides a traffic speed sample. Aggregating (e.g., averaging, weighted averaging, etc.) all the speed samples provides a speed estimate on the route during the sampling time period.

In an example embodiment, accuracy can be improved by leveraging social information. For example, if a cellular device's owner has a routine itinerary, such as driving to work between 8:30 AM and 9:00 AM on weekdays along a major highway and returns home between 5 PM and 5:30 PM, the service can use this routine/pattern to improve route determination accuracy. Further, knowledge of the cellular device's owner work address and/or home address, for example as indicated in the owner's profile, also can be used to improve route determination accuracy. Inferred/deduced trajectories obtained from localization regions can be assigned respective weights. When the inferred trajectory of a cellular device matches an expected pattern (route), the trajectory is assigned a higher weight than if the inferred trajectory does not match the expected pattern (route).

It is possible, that in some environments, such as in urban environments, many cellular devices will not be in moving vehicles, but rather in the possession of pedestrians and persons in buildings, or the like. To mitigate errors caused by incorporating information from cellular devices that are not in vehicles, obtained information can be categorized, and weights can be assigned to each categorization. For example, information can be categorized as a low speed or high speed, wherein low speed indicates samples from pedestrians, and a high speed indicates samples from vehicle carried cellular devices. In this example situation, only the aggregated speed from the vehicle carried cellular devices would be determined.

Additionally, although GPS-enabled devices are not necessary to determine live traffic information as described herein, GPS-enabled devices can be utilized. GPS-enabled devices can provide position checkpoints, which can help correct analysis errors and speed up route determination. To minimize or mitigate the impact on the communications network by GPS-enabled devices, GPS-enabled devices could be sampled infrequently, and/or only as an auxiliary means of obtaining localization information. In an example embodiment, subscribers having GPS-enabled devices could be encouraged to share GPS data obtained via their GPS-enabled devices by providing them a fee discount, or the like.

Figure 3:
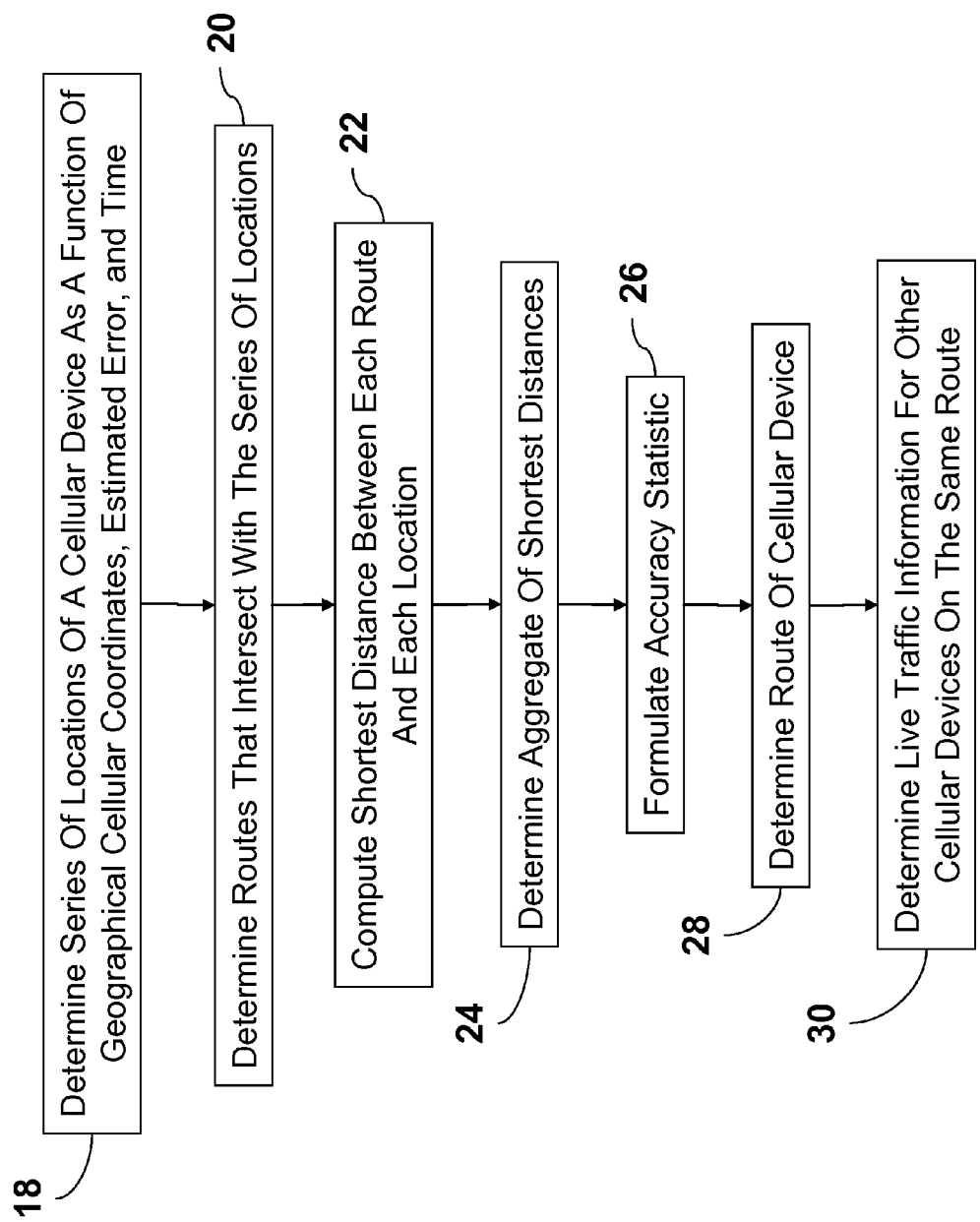
FIG. 3 is a flow diagram of an example process for determining live traffic information.

FIG. 3 is a flow diagram of an example process for determining live traffic information. As described herein, live traffic information is determined by determining course resolution localization and tracking in accordance with the cellular coverage available. And, fine resolution localization and tracking is inferred/deduced via specialized statistical analysis. For example, at step 18, a series of localization regions indicating locations of a cellular device are determined. The series of localization regions are determined as a function of the geographical cellular coordinates (e.g., x,y coordinates described above), an estimated error of the cellular localization mechanism (e.g., resolution error of the cellular tower), and time. At step 20, as described above, routes that intersect with the localization regions are determined. At step 22, the shortest distances between each route and each localization region are determined, as described above. The aggregate of the shortest distances is determined at step 24, as described above. An accuracy statistic, indicative of the accuracy of the deduced/inferred location and tracking information, as described above, is formulated at step 26. At step 28, a route for the cellular device is determined. At step 30, live traffic information (localization and tracking information) for other cellular devices on the same route is determined.

Figure 4:
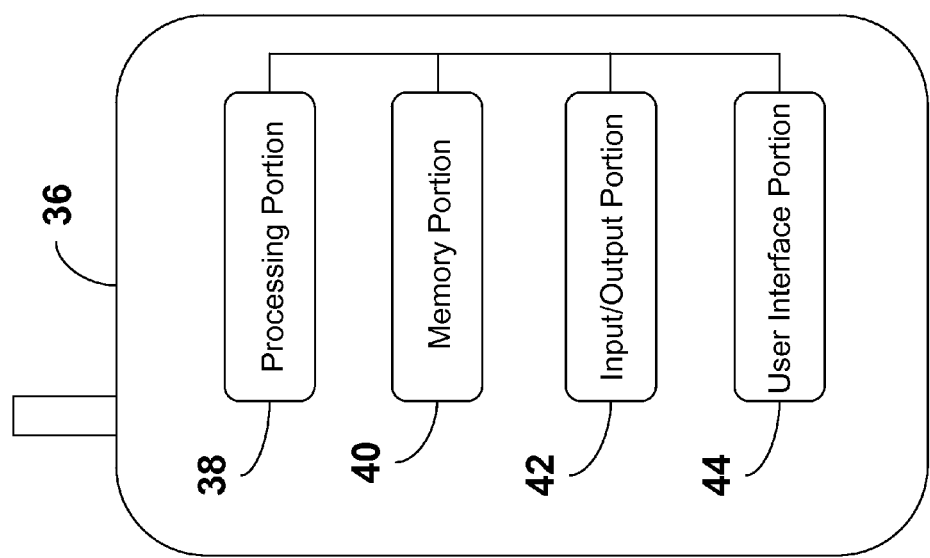
FIG. 4 is a block diagram of an example mobile wireless communications device utilizable to determine live traffic information.

FIG. 4 is a block diagram of an example cellular device 36 via which live traffic information can be determined. In an example configuration, the cellular device 36 is a wireless device. The cellular device 36 can comprise any appropriate device, examples of which include a portable computing device, such as a laptop, a personal digital assistant ("PDA"), a portable phone (e.g., a cell phone or the like, a smart phone, a video phone), a portable email device, a portable gaming device, a TV, a DVD player, portable media player, (e.g., a portable music player, such as an MP3 player, a walkmans, etc.), a portable navigation device (e.g., GPS compatible device, A-GPS compatible device, etc.), or a combination thereof. The cellular device 36 can include devices that are not typically thought of as portable, such as, for example, a public computing device, a navigation device installed in-vehicle, a set top box, or the like. The cellular device 36 can include non-conventional computing devices, such as, for example, a kitchen appliance, a motor vehicle control (e.g., steering wheel), etc., or the like.

The cellular device 36 can include any appropriate device, mechanism, software, and/or hardware for determining live traffic information as described herein. In an example configuration, the cellular device 36 comprises a processing portion 38, a memory portion 40, an input/output portion 42, and a user interface (UI) portion 44. It is emphasized that the block diagram depiction of cellular device 36 is exemplary and not intended to imply a specific implementation and/or configuration. For example, in an example configuration, the cellular device 36 comprises a cellular phone and the processing portion 38 and/or the memory portion 40 are implemented, in part or in total, on a subscriber identity module (SIM) of the mobile communications device 36. In another example configuration, the cellular device 36 comprises a laptop computer. The laptop computer can include a SIM, and various portions of the processing portion 38 and/or the memory portion 40 can be implemented on the SIM, on the laptop other than the SIM, or any combination thereof.

The processing portion 38, memory portion 40, and input/output portion 42 are coupled together to allow communications therebetween. In various embodiments, the input/output portion 42 comprises a receiver of the mobile communications device 36, a transmitter of the mobile communications device 36, or a combination thereof. The input/output portion 42 is capable of receiving and/or providing information pertaining to determining live traffic information as described above. For example, the input/output portion 42 is capable of receiving and/or sending signals to/from a cellular network, information pertaining to location, information pertaining to acceleration (e.g., accelerometers on the cellular device indicating characteristics of motion), or any combination thereof, as described herein. In an example embodiment, the input/output portion 42 is capable of receiving information to determine a location of the cellular device 36. In an example configuration, the input\output portion 42 comprises a GPS receiver. In various configurations, the input/output portion 42 can receive and/or provide information via any appropriate means, such as, for example, optical means (e.g., infrared), electromagnetic means (e.g., RF, WI-FI, BLUETOOTH, ZIGBEE, etc.), acoustic means (e.g., speaker, microphone, ultrasonic receiver, ultrasonic transmitter), or a combination thereof.

The processing portion 38 is capable of performing functions pertaining to determining live traffic information as described above. For example, the processing portion 38 is capable of determining course and fine resolution location and tracking information, determining a series of locations for a cellular device, determining a series of locations for a cellular device as a function of geographical cellular coordinates, estimated error, and time, determining routes that intersect with a location, computing a shortest distance, determining aggregate shortest distances, formulate an accuracy statistic, determining a route of a cellular device, determining live traffic for multiple cellular device on a route, as described above.

In a basic configuration, the cellular device 36 can include at least one memory portion 40. The memory portion 40 can store any information utilized in conjunction with determining live traffic information as described above. For example, the memory portion 52 is capable of storing information pertaining to a location of a cellular device, subscriber information, map data, or any combination thereof, as described above.

Depending upon the exact configuration and type of processor, the memory portion 40 can be volatile (such as some types of RAM), non-volatile (such as ROM, flash memory, etc.), or a combination thereof. The cellular device 36 can include additional storage (e.g., removable storage and/or non-removable storage) including, but not limited to, tape, flash memory, smart cards, CD-ROM, digital versatile disks (DVD) or other optical storage, magnetic cassettes, magnetic tape, magnetic disk storage or other magnetic storage devices, universal serial bus (USB) compatible memory, or any other medium which can be used to store information and which can be accessed by the mobile communications device 36.

The cellular device 36 also can contain a UI portion 44 allowing a user to communicate with the mobile communications device 36. The UI portion 44 can provide the ability to control the mobile communications device 36, via, for example, buttons, soft keys, voice actuated controls, a touch screen, movement of the mobile communications device 36, visual cues (e.g., moving a hand in front of a camera on the mobile communications device 36), or the like. The UI portion 44 can provide visual information (e.g., via a display), audio information (e.g., via speaker), mechanically (e.g., via a vibrating mechanism), or a combination thereof. In various configurations, the UI portion 44 can comprise a display, a touch screen, a keyboard, an accelerometer, a motion detector, a speaker, a microphone, a camera, a tilt sensor, or any combination thereof. The UI portion 44 can comprise means for inputting biometric information, such as, for example, fingerprint information, retinal information, voice information, and/or facial characteristic information. The UI portion 44 can provide information pertaining to live traffic information, such as, for example, a map indicating routes, a map having live traffic information overlaid thereon, a map indicating traffic density of routes, or any combination thereof, as described herein.

Figure 5:
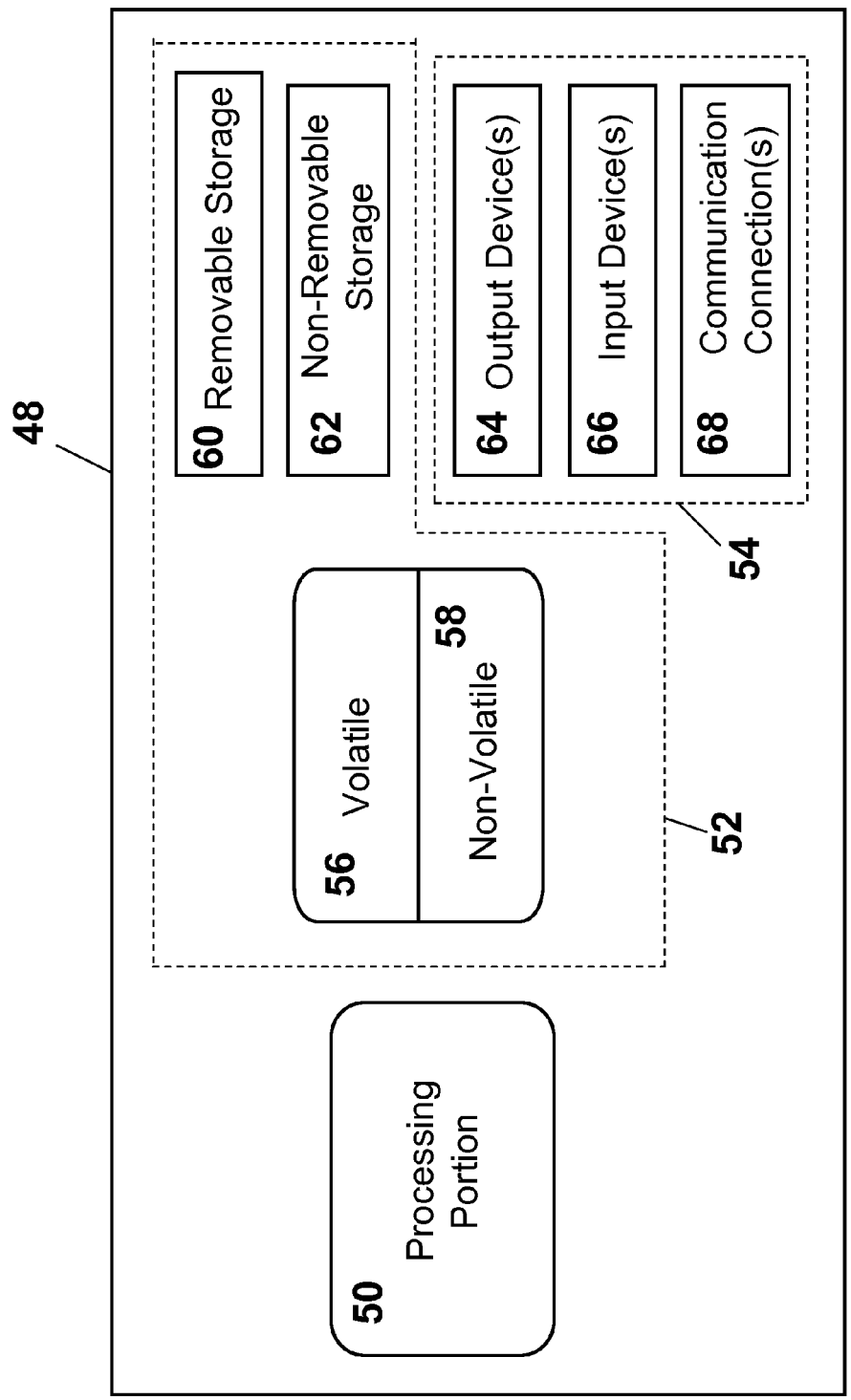
FIG. 5 is a block diagram of an example processor 48 for determining live traffic information.

FIG. 5 is a block diagram of an example processor 48 for determining live traffic information, as described herein. The processor 48 depicted in FIG. 5 can represent any appropriate device, examples of which include a processor, a computer, a server, a portable computing device, such as a laptop, a personal digital assistant ("PDA"), a portable phone (e.g., a cell phone or the like, a smart phone, a video phone), or any combination thereof. The processor 48 depicted in FIG. 5 can represent any appropriate network entity, such as a processor, a server, a gateway, or the like, or any combination thereof. It is emphasized that the block diagram depicted in FIG. 5 is exemplary and not intended to imply a specific implementation or configuration. Thus, the processor 48 can be implemented in a single processor or multiple processors (e.g., single server or multiple servers, single gateway or multiple gateways, single network entity or multiple network entities). The processor 48 can be distributed, centrally located, and/or integrated. Multiple components of the processor 48 can communicate wirelessly, via hard wire, or a combination thereof.

In an example configuration, the processor 48 comprises a processing portion 50, a memory portion 52, and an input/output portion 54. The processing portion 50, memory portion 52, and input/output portion 54 are coupled together (coupling not shown in FIG. 5) to allow communications therebetween. The input/output portion 54 is capable of receiving and/or providing information pertaining to determining live traffic information as described above. In an example embodiment, the input/output portion 54 is capable of receiving/providing signals to/from a cellular device, information pertaining to a location of a cellular device, information pertaining to acceleration (e.g., accelerometers on the cellular device indicating characteristics of motion), information pertaining to tracking a cellular device, map information, information from other processors, or any combination thereof, as described above. In an example configuration, the input/output portion 54 comprises a GPS receiver. In various configurations, the input/output portion 54 can receive and/or provide information via any appropriate means, such as, for example, optical means (e.g., infrared), electromagnetic means (e.g., RF, WI-FI, BLUETOOTH, ZIGBEE, etc.), acoustic means (e.g., speaker, microphone, ultrasonic receiver, ultrasonic transmitter), wired means, or a combination thereof.

The processing portion 50 is capable of performing functions pertaining to determining live traffic information as described above. For example, the processing portion 50 is capable of determining course and fine resolution location and tracking information, determining a series of locations for a cellular device, determining a series of locations for a cellular device as a function of geographical cellular coordinates, estimated error, and time, determining routes that intersect with a location, computing a shortest distance, determining aggregate shortest distances, formulate an accuracy statistic, determining a route of a cellular device, determining live traffic for multiple cellular device on a route, or any combination thereof, as described above.

In a basic configuration, the processor 48 can include at least one memory portion 52. The memory portion 52 can store any information utilized in conjunction with determining live traffic information as described above. For example, the memory portion 52 is capable of storing information pertaining to a location of a cellular device, subscriber information, map data, or any combination thereof, as described above.

Depending upon the exact configuration and type of processor 48, the memory portion 52 can include computer readable storage media that is volatile 56 (such as some types of RAM), non-volatile 58 (such as ROM, flash memory, etc.), or a combination thereof. The processor 48 can include additional storage, in the form of computer readable storage media (e.g., removable storage 60 and/or non-removable storage 62) including, but not limited to, RAM, ROM, EEPROM, tape, flash memory, smart cards, CD-ROM, digital versatile disks (DVD) or other optical storage, magnetic cassettes, magnetic tape, magnetic disk storage or other magnetic storage devices, universal serial bus (USB) compatible memory, or any other medium which can be used to store information and which can be accessed by the processor 48.

The processor 48 also can contain communications connection(s) 68 that allow the processor 48 to communicate with other devices, network entities, terminations, or the like. A communications connection(s) can comprise communication media. Communication media typically embody computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared, and other wireless media. The term computer readable media as used herein includes both storage media and can include communication media. The system also can have input device (s) 66 such as keyboard, mouse, pen, voice input device, touch input device, etc. Output device(s) 64 such as a display, speakers, printer, etc. also can be included.

Figure 6:
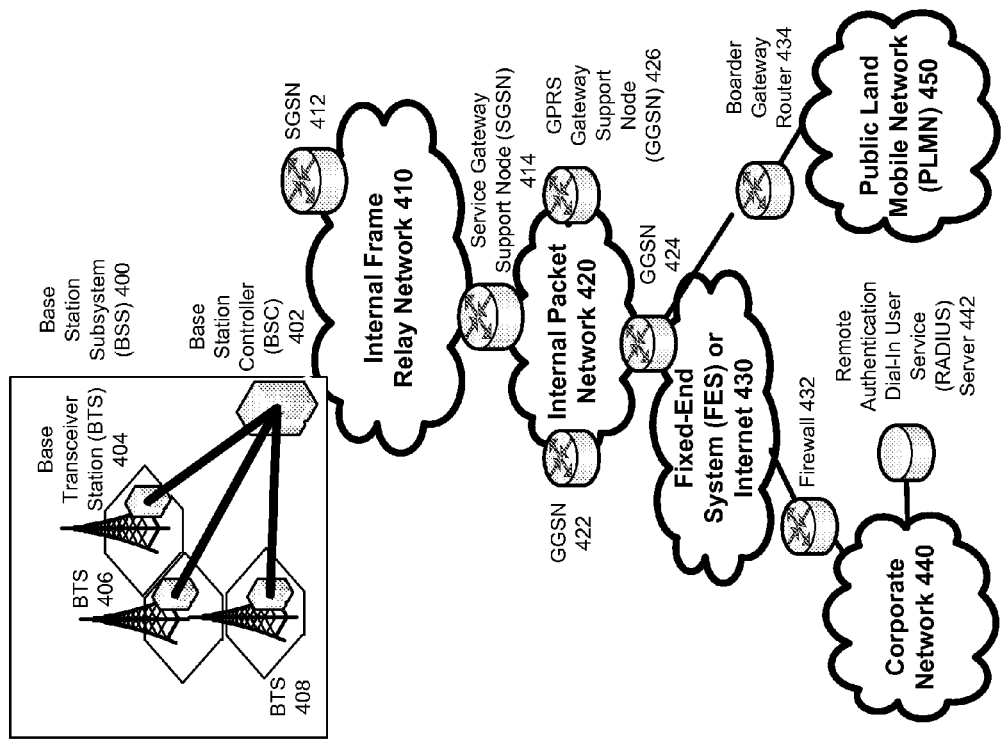
FIG. 6 depicts a block diagram of an exemplary packet-based mobile cellular network environment, such as a GPRS network, in which live traffic information can be determined.

FIG. 6 depicts an overall block diagram of an exemplary packet-based mobile cellular network environment, such as a GPRS network, in which live traffic information can be determined as described herein. In the exemplary packet-based mobile cellular network environment shown in FIG. 6, there are a plurality of Base Station Subsystems ("BSS") 400 (only one is shown), each of which comprises a Base Station Controller ("BSC") 402 serving a plurality of Base Transceiver Stations ("BTS") such as BTSs 404, 406, and 408. BTSs 404, 406, 408, etc. are the access points where users of packet-based mobile devices become connected to the wireless network. In exemplary fashion, the packet traffic originating from user devices is transported via an over-the-air interface to a BTS 408, and from the BTS 408 to the BSC 402. Base station subsystems, such as BSS 400, are a part of internal frame relay network 410 that can include Service GPRS Support Nodes ("SGSN") such as SGSN 412 and 414. Each SGSN is connected to an internal packet network 420 through which a SGSN 412, 414, etc. can route data packets to and from a plurality of gateway GPRS support nodes (GGSN) 422, 424, 426, etc. As illustrated, SGSN 414 and GGSNs 422, 424, and 426 are part of internal packet network 420. Gateway GPRS serving nodes 422, 424 and 426 mainly provide an interface to external Internet Protocol ("IP") networks such as Public Land Mobile Network ("PLMN") 450, corporate intranets 440, or Fixed-End System ("FES") or the public Internet 430. As illustrated, subscriber corporate network 440 may be connected to GGSN 424 via firewall 432; and PLMN 450 is connected to GGSN 424 via boarder gateway router 434. The Remote Authentication Dial-In User Service ("RADIUS") server 442 may be used for caller authentication when a user of a mobile cellular device calls corporate network 440.

Generally, there can be a several cell sizes in a GSM network, referred to as macro, micro, pico, femto, and umbrella cells. The coverage area of each cell is different in different environments. Macro cells can be regarded as cells in which the base station antenna is installed in a mast or a building above average roof top level. Micro cells are cells whose antenna height is under average roof top level. Micro-cells are typically used in urban areas. Pico cells are small cells having a diameter of a few dozen meters. Pico cells are used mainly indoors. Femto cells have the same size as pico cells, but a smaller transport capacity. Femto cells are used indoors, in residential, or small business environments. On the other hand, umbrella cells are used to cover shadowed regions of smaller cells and fill in gaps in coverage between those cells.

Figure 7:
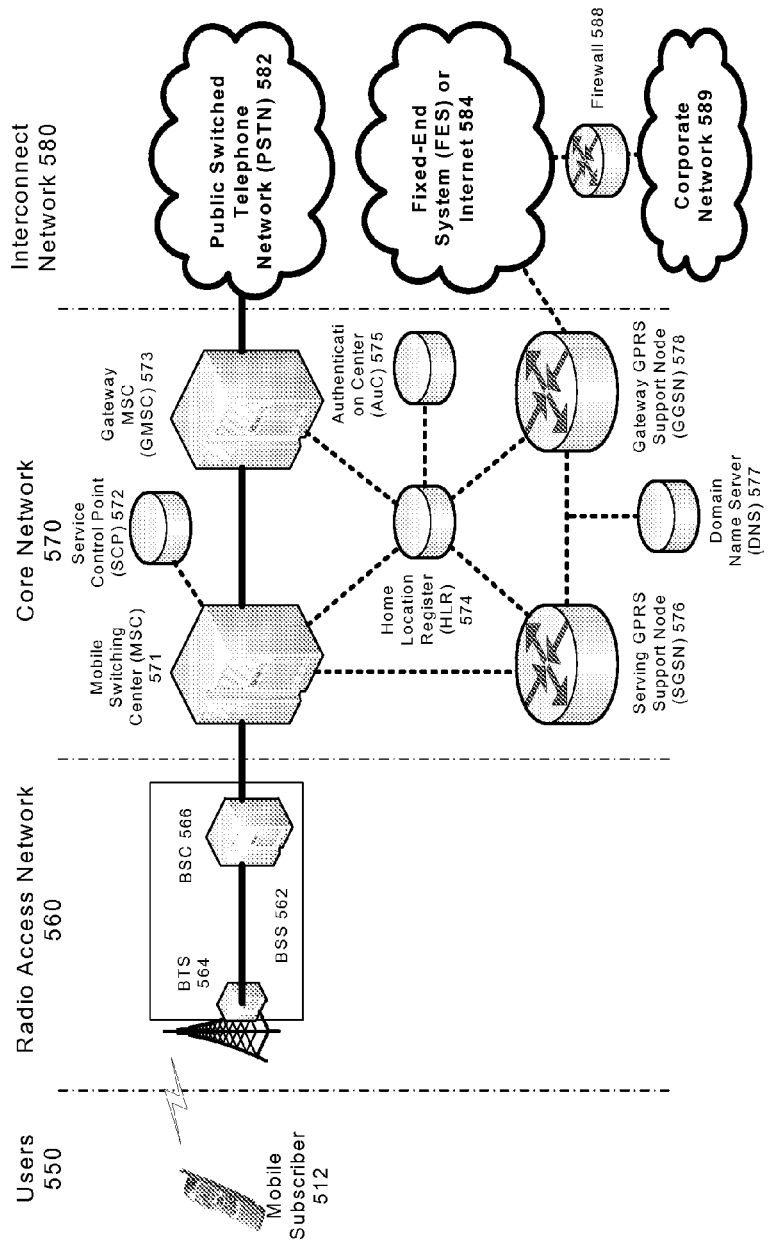
FIG. 7 illustrates an architecture of a typical GPRS network in which live traffic information can be determined.

FIG. 7 illustrates an architecture of a typical GPRS network in which live traffic information can be determined as described herein. The architecture depicted in FIG. 7 is segmented into four groups: users 550, radio access network 560, core network 570, and interconnect network 580. Users 550 comprise a plurality of end users. Note, device 512 is referred to as a mobile subscriber in the description of network shown in FIG. 7. In an example embodiment, the device depicted as mobile subscriber 512 comprises a mobile device (e.g., cellular device 48). Radio access network 560 comprises a plurality of base station subsystems such as BSSs 562, which include BTSs 564 and BSCs 566. Core network 570 comprises a host of various network elements. As illustrated in FIG. 7, core network 570 may comprise Mobile Switching Center ("MSC") 571, Service Control Point ("SCP") 572, gateway MSC 573, SGSN 576, Home Location Register ("HLR") 574, Authentication Center ("AuC") 575, Domain Name Server ("DNS") 577, and GGSN 578. Interconnect network 580 also comprises a host of various networks and other network elements. As illustrated in FIG. 7, interconnect network 580 comprises Public Switched Telephone Network ("PSTN") 582, Fixed-End System ("FES") or Internet 584, firewall 588, and Corporate Network 589.

A mobile switching center can be connected to a large number of base station controllers. At MSC 571, for instance, depending on the type of traffic, the traffic may be separated in that voice may be sent to Public Switched Telephone Network ("PSTN") 582 through Gateway MSC ("GMSC") 573, and/or data may be sent to SGSN 576, which then sends the data traffic to GGSN 578 for further forwarding.

When MSC 571 receives call traffic, for example, from BSC 566, it sends a query to a database hosted by SCP 572. The SCP 572 processes the request and issues a response to MSC 571 so that it may continue call processing as appropriate.

The HLR 574 is a centralized database for users to register to the GPRS network. HLR 574 stores static information about the subscribers such as the International Mobile Subscriber Identity ("IMSI"), subscribed services, and a key for authenticating the subscriber. HLR 574 also stores dynamic subscriber information such as the current location of the mobile subscriber. Associated with HLR 574 is AuC 575. AuC 575 is a database that contains the algorithms for authenticating subscribers and includes the associated keys for encryption to safeguard the user input for authentication.

In the following, depending on context, the term "mobile subscriber" sometimes refers to the end user and sometimes to the actual portable device, such as a mobile device (e.g., mobile wireless communications device 46), used by an end user of the mobile cellular service. When a mobile subscriber turns on his or her mobile device, the mobile device goes through an attach process by which the mobile device attaches to an SGSN of the GPRS network. In FIG. 7, when mobile subscriber 512 initiates the attach process by turning on the network capabilities of the mobile device, an attach request is sent by mobile subscriber 512 to SGSN 576. The SGSN 576 queries another SGSN, to which mobile subscriber 512 was attached before, for the identity of mobile subscriber 512. Upon receiving the identity of mobile subscriber 512 from the other SGSN, SGSN 576 requests more information from mobile subscriber 512. This information is used to authenticate mobile subscriber 512 to SGSN 576 by HLR 574. Once verified, SGSN 576 sends a location update to HLR 574 indicating the change of location to a new SGSN, in this case SGSN 576. HLR 574 notifies the old SGSN, to which mobile subscriber 512 was attached before, to cancel the location process for mobile subscriber 512. HLR 574 then notifies SGSN 576 that the location update has been performed. At this time, SGSN 576 sends an Attach Accept message to mobile subscriber 512, which in turn sends an Attach Complete message to SGSN 576.

After attaching itself with the network, mobile subscriber 512 then goes through the authentication process. In the authentication process, SGSN 576 sends the authentication information to HLR 574, which sends information back to SGSN 576 based on the user profile that was part of the user's initial setup. The SGSN 576 then sends a request for authentication and ciphering to mobile subscriber 512. The mobile subscriber 512 uses an algorithm to send the user identification (ID) and password to SGSN 576. The SGSN 576 uses the same algorithm and compares the result. If a match occurs, SGSN 576 authenticates mobile subscriber 512.

Next, the mobile subscriber 512 establishes a user session with the destination network, corporate network 589, by going through a Packet Data Protocol ("PDP") activation process. Briefly, in the process, mobile subscriber 512 requests access to the Access Point Name ("APN"), for example, UPS.com, and SGSN 576 receives the activation request from mobile subscriber 512. SGSN 576 then initiates a Domain Name Service ("DNS") query to learn which GGSN node has access to the UPS.com APN. The DNS query is sent to the DNS server within the core network 570, such as DNS 577, which is provisioned to map to one or more GGSN nodes in the core network 570. Based on the APN, the mapped GGSN 578 can access the requested corporate network 589. The SGSN 576 then sends to GGSN 578 a Create Packet Data Protocol ("PDP") Context Request message that contains necessary information. The GGSN 578 sends a Create PDP Context Response message to SGSN 576, which then sends an Activate PDP Context Accept message to mobile subscriber 512.

Once activated, data packets of the call made by mobile subscriber 512 can then go through radio access network 560, core network 570, and interconnect network 580, in a particular fixed-end system or Internet 584 and firewall 588, to reach corporate network 589.

Figure 8:
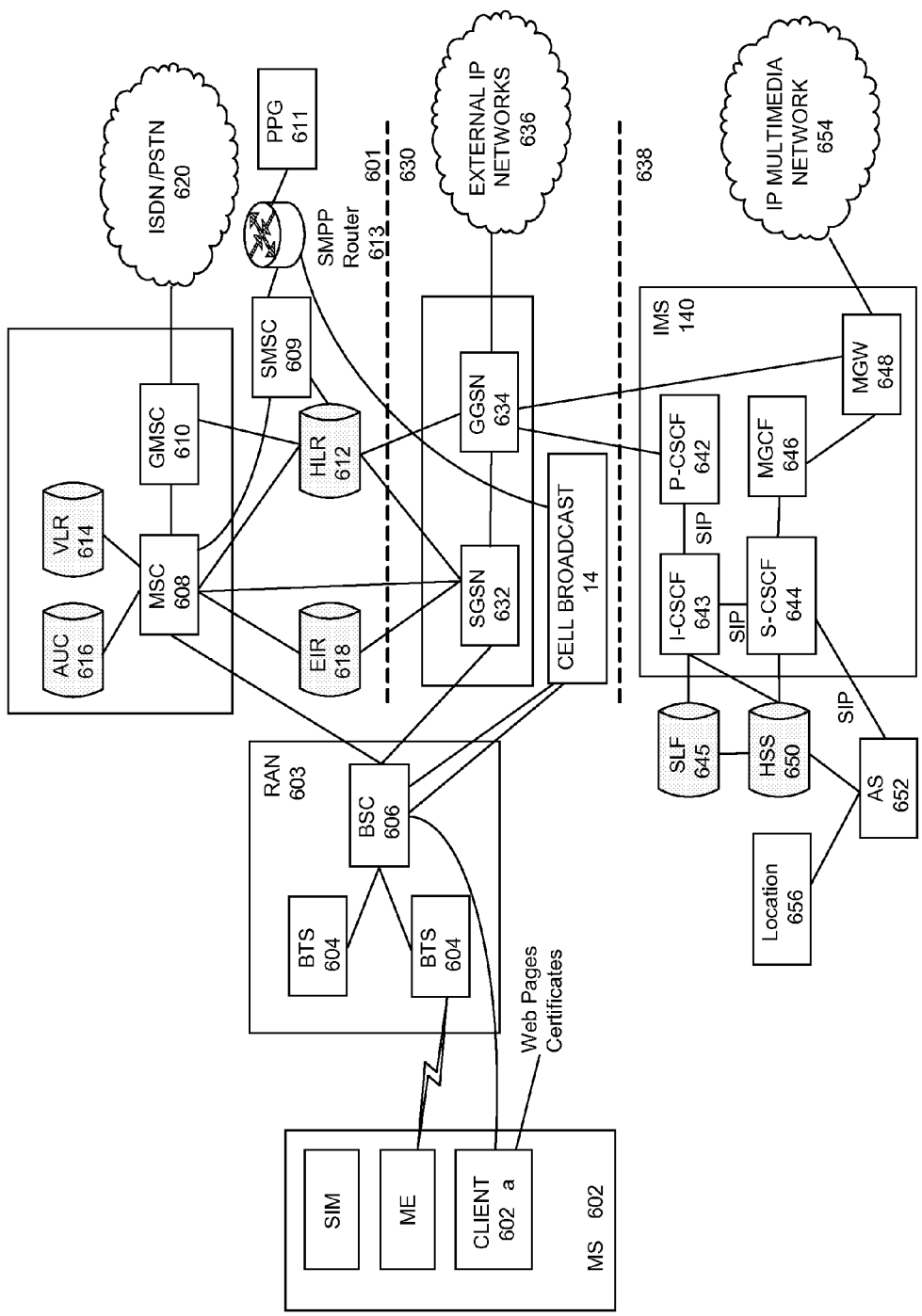
FIG. 8 illustrates an exemplary block diagram view of a GSM/GPRS/IP multimedia network architecture within which live traffic information can be determined.

FIG. 8 illustrates an exemplary block diagram view of a GSM/GPRS/IP multimedia network architecture 600 within which live traffic information can be determined as described herein. As illustrated, architecture 600 of FIG. 8 includes a GSM core network 601, a GPRS network 630 and an IP multimedia network 638. The GSM core network 601 includes a Mobile Station (MS) 602, at least one Base Transceiver Station (BTS) 604 and a Base Station Controller (BSC) 606. The MS 602 is physical equipment or Mobile Equipment (ME), such as a mobile phone or a laptop computer that is used by mobile subscribers, with a Subscriber identity Module (SIM) or a Universal Integrated Circuit Card (UICC). The SIM or UICC includes an International Mobile Subscriber Identity (IMSI), which is a unique identifier of a subscriber. The BTS 604 is physical equipment, such as a radio tower, that enables a radio interface to communicate with the MS. Each BTS may serve more than one MS. The BSC 606 manages radio resources, including the BTS. The BSC may be connected to several BTSs. The BSC and BTS components, in combination, are generally referred to as a base station (BSS) or radio access network (RAN) 603.

The GSM core network 601 also includes a Mobile Switching Center (MSC) 608, a Gateway Mobile Switching Center (GMSC) 610, a Home Location Register (HLR) 612, Visitor Location Register (VLR) 614, an Authentication Center (AuC) 618, and an Equipment Identity Register (EIR) 616.

The MSC 608 performs a switching function for the network. The MSC also performs other functions, such as registration, authentication, location updating, handovers, and call routing. The GMSC 610 provides a gateway between the GSM network and other networks, such as an Integrated Services Digital Network (ISDN) or Public Switched Telephone Networks (PSTNs) 620. Thus, the GMSC 610 provides interworking functionality with external networks.

The HLR 612 is a database that contains administrative information regarding each subscriber registered in a corresponding GSM network. The HLR 612 also contains the current location of each MS. The VLR 614 is a database that contains selected administrative information from the HLR 612. The VLR contains information necessary for call control and provision of subscribed services for each MS currently located in a geographical area controlled by the VLR. The HLR 612 and the VLR 614, together with the MSC 608, provide the call routing and roaming capabilities of GSM. The AuC 616 provides the parameters needed for authentication and encryption functions. Such parameters allow verification of a subscriber's identity. The EIR 618 stores security-sensitive information about the mobile equipment.

A Short Message Service Center (SMSC) 609 allows one-to-one Short Message Service (SMS) messages to be sent to/from the MS 602. A Push Proxy Gateway (PPG) 611 is used to "push" (i.e., send without a synchronous request) content to the MS 602. The PPG 611 acts as a proxy between wired and wireless networks to facilitate pushing of data to the MS 602. A Short Message Peer to Peer (SMPP) protocol router 613 is provided to convert SMS-based SMPP messages to cell broadcast messages. SMPP is a protocol for exchanging SMS messages between SMS peer entities such as short message service centers. The SMPP protocol is often used to allow third parties, e.g., content suppliers such as news organizations, to submit bulk messages.

To gain access to GSM services, such as speech, data, and short message service (SMS), the MS first registers with the network to indicate its current location by performing a location update and IMSI attach procedure. The MS 602 sends a location update including its current location information to the MSC/VLR, via the BTS 604 and the BSC 606. The location information is then sent to the MS's HLR. The HLR is updated with the location information received from the MSC/VLR. The location update also is performed when the MS moves to a new location area. Typically, the location update is periodically performed to update the database as location updating events occur.

The GPRS network 630 is logically implemented on the GSM core network architecture by introducing two packet-switching network nodes, a serving GPRS support node (SGSN) 632, a cell broadcast and a Gateway GPRS support node (GGSN) 634. The SGSN 632 is at the same hierarchical level as the MSC 608 in the GSM network. The SGSN controls the connection between the GPRS network and the MS 602. The SGSN also keeps track of individual MS's locations and security functions and access controls.

A Cell Broadcast Center (CBC) 14 communicates cell broadcast messages that are typically delivered to multiple users in a specified area. Cell Broadcast is one-to-many geographically focused service. It enables messages to be communicated to multiple mobile phone customers who are located within a given part of its network coverage area at the time the message is broadcast.

The GGSN 634 provides a gateway between the GPRS network and a public packet network (PDN) or other IP networks 636. That is, the GGSN provides interworking functionality with external networks, and sets up a logical link to the MS through the SGSN. When packet-switched data leaves the GPRS network, it is transferred to an external TCP-IP network 636, such as an X.25 network or the Internet. In order to access GPRS services, the MS first attaches itself to the GPRS network by performing an attach procedure. The MS then activates a packet data protocol (PDP) context, thus activating a packet communication session between the MS, the SGSN, and the GGSN.

In a GSM/GPRS network, GPRS services and GSM services can be used in parallel. The MS can operate in one of three classes: class A, class B, and class C. A class A MS can attach to the network for both GPRS services and GSM services simultaneously. A class A MS also supports simultaneous operation of GPRS services and GSM services. For example, class A mobiles can receive GSM voice/data/SMS calls and GPRS data calls at the same time.

A class B MS can attach to the network for both GPRS services and GSM services simultaneously. However, a class B MS does not support simultaneous operation of the GPRS services and GSM services. That is, a class B MS can only use one of the two services at a given time.

A class C MS can attach for only one of the GPRS services and GSM services at a time. Simultaneous attachment and operation of GPRS services and GSM services is not possible with a class C MS.

A GPRS network 630 can be designed to operate in three network operation modes (NOM1, NOM2 and NOM3). A network operation mode of a GPRS network is indicated by a parameter in system information messages transmitted within a cell. The system information messages dictates a MS where to listen for paging messages and how to signal towards the network. The network operation mode represents the capabilities of the GPRS network. In a NOM1 network, a MS can receive pages from a circuit switched domain (voice call) when engaged in a data call. The MS can suspend the data call or take both simultaneously, depending on the ability of the MS. In a NOM2 network, a MS may not received pages from a circuit switched domain when engaged in a data call, since the MS is receiving data and is not listening to a paging channel In a NOM3 network, a MS can monitor pages for a circuit switched network while received data and vise versa.

The IP multimedia network 638 was introduced with 3GPP Release 5, and includes an IP multimedia subsystem (IMS) 640 to provide rich multimedia services to end users. A representative set of the network entities within the IMS 640 are a call/session control function (CSCF), a media gateway control function (MGCF) 646, a media gateway (MGW) 648, and a master subscriber database, called a home subscriber server (HSS) 650. The HSS 650 may be common to the GSM network 601, the GPRS network 630 as well as the IP multimedia network 638.

The IP multimedia system 640 is built around the call/session control function, of which there are three types: an interrogating CSCF (I-CSCF) 643, a proxy CSCF (P-CSCF) 642, and a serving CSCF (S-CSCF) 644. The P-CSCF 642 is the MS's first point of contact with the IMS 640. The P-CSCF 642 forwards session initiation protocol (SIP) messages received from the MS to an SIP server in a home network (and vice versa) of the MS. The P-CSCF 642 may also modify an outgoing request according to a set of rules defined by the network operator (for example, address analysis and potential modification).

The I-CSCF 643, forms an entrance to a home network and hides the inner topology of the home network from other networks and provides flexibility for selecting an S-CSCF. The I-CSCF 643 may contact a subscriber location function (SLF) 645 to determine which HSS 650 to use for the particular subscriber, if multiple HSS's 650 are present. The S-CSCF 644 performs the session control services for the MS 602. This includes routing originating sessions to external networks and routing terminating sessions to visited networks. The S-CSCF 644 also decides whether an application server (AS) 652 is required to receive information on an incoming SIP session request to ensure appropriate service handling. This decision is based on information received from the HSS 650 (or other sources, such as an application server 652). The AS 652 also communicates to a location server 656 (e.g., a Gateway Mobile Location Center (GMLC)) that provides a position (e.g., latitude/longitude coordinates) of the MS 602.

The HSS 650 contains a subscriber profile and keeps track of which core network node is currently handling the subscriber. It also supports subscriber authentication and authorization functions (AAA). In networks with more than one HSS 650, a subscriber location function provides information on the HSS 650 that contains the profile of a given subscriber.

The MGCF 646 provides interworking functionality between SIP session control signaling from the IMS 640 and ISUP/BICC call control signaling from the external GSTN networks (not shown). It also controls the media gateway (MGW) 648 that provides user-plane interworking functionality (e.g., converting between AMR- and PCM-coded voice). The MGW 648 also communicates with other IP multimedia networks 654.

Push to Talk over Cellular (PoC) capable mobile phones register with the wireless network when the phones are in a predefined area (e.g., job site, etc.). When the mobile phones leave the area, they register with the network in their new location as being outside the predefined area. This registration, however, does not indicate the actual physical location of the mobile phones outside the pre-defined area.

While example embodiments of determining live traffic information have been described in connection with various computing devices/processor, the underlying concepts can be applied to any computing device, processor, or system capable of providing and/or receiving information pertaining to live traffic information. The various techniques described herein can be implemented in connection with hardware or software or, where appropriate, with a combination of both. Thus, the methods and apparatuses for determining live traffic information, or certain aspects or portions thereof, can take the form of program code (i.e., instructions) embodied in tangible storage media, such as floppy diskettes, CD-ROMs, hard drives, or any other machine-readable storage medium, wherein, when the program code is loaded into and executed by a machine, such as a computer, the machine becomes an apparatus for determining live traffic information. In the case of program code executable on programmable computers, the computing device will generally include a processor, a storage medium readable by the processor (including volatile and non-volatile memory and/or storage elements), at least one input device, and at least one output device. The program(s) can be implemented in assembly or machine language, if desired. The language can be a compiled or interpreted language, and combined with hardware implementations.

The methods and apparatuses for determining live traffic information also can be practiced via communications embodied in the form of program code that is transmitted over some transmission medium, such as over electrical wiring or cabling, through fiber optics, or via any other form of transmission, wherein, when the program code is received and loaded into and executed by a machine, such as an EPROM, a gate array, a programmable logic device (PLD), a client computer, or the like, the machine becomes an apparatus determining live traffic information. When implemented on a general-purpose processor, the program code combines with the processor to provide a unique apparatus that operates to invoke the functionality of determining live traffic information. Additionally, any storage techniques used in connection with the utilization of determining live traffic information can invariably be a combination of hardware and software.

While determining live traffic information has been described in connection with the various embodiments of the various figures, it is to be understood that other similar embodiments can be used or modifications and additions can be made to the described embodiment for performing the same functions of determining live traffic information without deviating therefrom. For example, one skilled in the art will recognize that determining live traffic information as described in the present application may apply to any environment, whether wired or wireless, and may be applied to any number of such devices connected via a communications network and interacting across the network. Therefore, determining live traffic information should not be limited to any single embodiment, but rather should be construed in breadth and scope in accordance with the appended claims.

What is claimed:

1. A method comprising:
   determining a plurality of geographic regions, each geographic region of the plurality of geographic regions being indicative of a location of a device;
   determining social information pertaining to a user of the device;
   based at least on the determined social information, determining at least one route that intersects all the geographic regions of the plurality of geographic regions;
   determining, for each of the at least one route, a shortest distance between a centroid of each geographic region of the plurality of geographic regions and the at least one route;
   aggregating the determined shortest distances; and
   determining traffic information based on the aggregated shortest distances.

2. The method of claim 1, further comprising formulating an accuracy statistic pertaining to the traffic information.

3. The method of claim 1, wherein each geographic region of the plurality of geographic regions is a function of geographical coordinates, an error associated with an accuracy of the geographical coordinates, and time.

4. The method of claim 1, further comprising:
   determining a plurality of estimated locations for the device; and
   determining a route of the device based upon the plurality of estimated locations.

5. The method of claim 4, further comprising rendering a representation of the estimated locations.

6. The method of claim 4, further comprising visually rendering a representation of the estimated locations overlaid on a map.

7. An apparatus comprising:
   a processor; and
   memory coupled to the processor, the memory comprising at least one executable instruction that when executed by the processor causes the processor to effectuate operations comprising:
      determining a plurality of geographic regions, each geographic region of the plurality of geographic regions being indicative of a location of a device;
      determining social information pertaining to a user of the device;

based at least on the determined social information, determining at least one route that intersects all the geographic regions of the plurality of geographic regions;

determining, for each of the at least one route, a shortest distance between a centroid of each geographic region of the plurality of geographic regions and the at least one route;

aggregating the determined shortest distances; and determining traffic information based on the aggregated shortest distances.

8. The apparatus of claim 7, further comprising formulating an accuracy statistic pertaining to the traffic information.

9. The apparatus of claim 7, wherein each geographic region of the plurality of geographic regions is a function of geographical coordinates, an error associated with an accuracy of the geographical coordinates, and time.

10. The apparatus of claim 7, further comprising:
determining a plurality of estimated locations for the device; and
determining a route of the device based upon the plurality of estimated locations.

11. The apparatus of claim 10, further comprising rendering the estimated locations.

12. The apparatus of claim 10, further comprising visually rendering the estimated locations overlaid on a map.

13. A computer-readable storage medium that is not a propagating signal, the computer-readable storage comprising executable instructions that when executed by a processor causes the processor to effectuate operations comprising:
determining a plurality of geographic regions, each geographic region of the plurality of geographic regions being indicative of a location of a device;
determining social information pertaining to a user of the device;
based at least on the determined social information, determining at least one route that intersects all the geographic regions of the plurality of geographic regions;
determining, for each of the at least one route, a shortest distance between a centroid of each geographic region of the plurality of geographic regions and the at least one route;
aggregating the determined shortest distances; and
determining traffic information based on the aggregated shortest distances.

14. The computer-readable storage medium of claim 13, further comprising formulating an accuracy statistic pertaining to the traffic information.

15. The computer-readable storage medium of claim 13, wherein each geographic region of the plurality of geographic regions is a function of geographical coordinates, an error associated with an accuracy of the geographical coordinates, and time.

16. The computer-readable storage medium of claim 13, further comprising:
determining a plurality of estimated locations for the device; and
determining a route of the device based upon the plurality of estimated locations.

17. The computer-readable storage medium of claim 16, further comprising rendering a representation of a representation of the estimated locations.

18. The computer-readable storage medium of claim 16, further comprising visually rendering a representation of a representation of the estimated locations overlaid on a map.

* * * * *